United States Patent [19]

Mastrangelo et al.

[11] Patent Number: 5,364,152

[45] Date of Patent: Nov. 15, 1994

[54] ADJUSTABLE SEAT FOR VAN-TYPE VEHICLES

[75] Inventors: James J. Mastrangelo, Troy; Michel L. Duchesneau, Novi; Richard A. Hayden, Troy, all of Mich.

[73] Assignee: General Motors Corporation, Detroit, Mich.

[21] Appl. No.: 65,208

[22] Filed: May 24, 1993

[51] Int. Cl.$^5$ .............................................. B60N 1/08
[52] U.S. Cl. ................................... 296/65.1; 297/341; 297/329
[58] Field of Search ................ 296/65.1; 297/340, 341, 297/344.1, 313, 317, 318, 322, 329

[56] References Cited

U.S. PATENT DOCUMENTS

| | | | |
|---|---|---|---|
| 4,209,159 | 6/1980 | Becker et al. | 297/344.1 X |
| 4,700,989 | 10/1987 | Ercilla | 297/331 |
| 4,743,066 | 5/1988 | Boisset et al. | 297/341 X |
| 4,881,827 | 11/1989 | Borlinghaus et al. | 297/341 X |
| 5,011,209 | 4/1991 | Takarabe et al. | 296/65.1 |
| 5,020,853 | 6/1991 | Babbs | 297/341 |
| 5,207,480 | 5/1993 | Johnson et al. | 297/329 X |
| 5,280,987 | 1/1994 | Miller | 296/65.1 |

*Primary Examiner*—Joseph Pape
*Attorney, Agent, or Firm*—Ernest E. Helms

[57] ABSTRACT

An arrangement of a vehicle seat for placement on a vehicle floor having a seat in a storage position is provided in a preferred embodiment including two elongated rails connected to the vehicle floor, the rails having a first hook and a plurality of notches to provide a locking plate; a slider for each side of the vehicle seat having a second hook interlocked with the rail's first hook; a locking pin for selective engagement with the rail notches, the locking pin being connected with the slider to selectively set the position of the slider with respect to the rail; a riser pivotally connected with each slider; and a seat bun connected with the risers, the seat bun assuming a storage position by forward pivotal movement of the risers.

10 Claims, 3 Drawing Sheets

ADJUSTABLE SEAT FOR VAN-TYPE VEHICLES

FIELD OF THE INVENTION

The field of the present invention is arrangements of vehicle seats. More particularly, the present invention refers to arrangements for vehicle seats in van- or minivan-type vehicles wherein the seat in a storage position has a generally upright storage position.

BACKGROUND OF THE INVENTION

It is known to have seats in minivans wherein a seatback is pivotally mounted with respect to a seat bun frame (or seat pan) and, when not in use, the seatback can be folded forward to provide a table surface on top of the seat bun frame. It is also known to provide such above-noted seats which can be removed from the vehicle without the use of tooling. To provide more floor space in the van or minivan when the seats are not being utilized (and it is not desired to remove them), it has been known to provide seats which assume a generally upright storage position wherein the forward riser of the seat is pivoted upward after the rear riser has been released from the vehicle floor and thereupon assumes a generally upright position. Most minivans have a front row, a second intermediate row generally adjacent to the front row, and a rear row which is usually limited to two seats to accommodate the intrusion into the passenger compartment by the vehicle rear wheel wells. When not in use, it is preferable that the seats in the third most rearward row be stored adjacent a rear entry door of the van to accommodate the maximum space accessible by a side cargo door. In other instances, it is preferable that the third row of seats in the storage position be positioned forwardly as adjacent to the second row of seats as possible to maximize the storage available from the rear entry door of the vehicle. Therefore, it is preferable to provide an arrangement of a vehicle seat having a plurality of storage positions for the third row of a minivan.

SUMMARY OF THE INVENTION

To meet the above-noted needs, the present invention brings forth a seat arrangement for a van- or minivan-type vehicle wherein the seat has a plurality of generally upright storage positions.

DESCRIPTION OF THE PREFERRED EMBODIMENT

Figure 3:
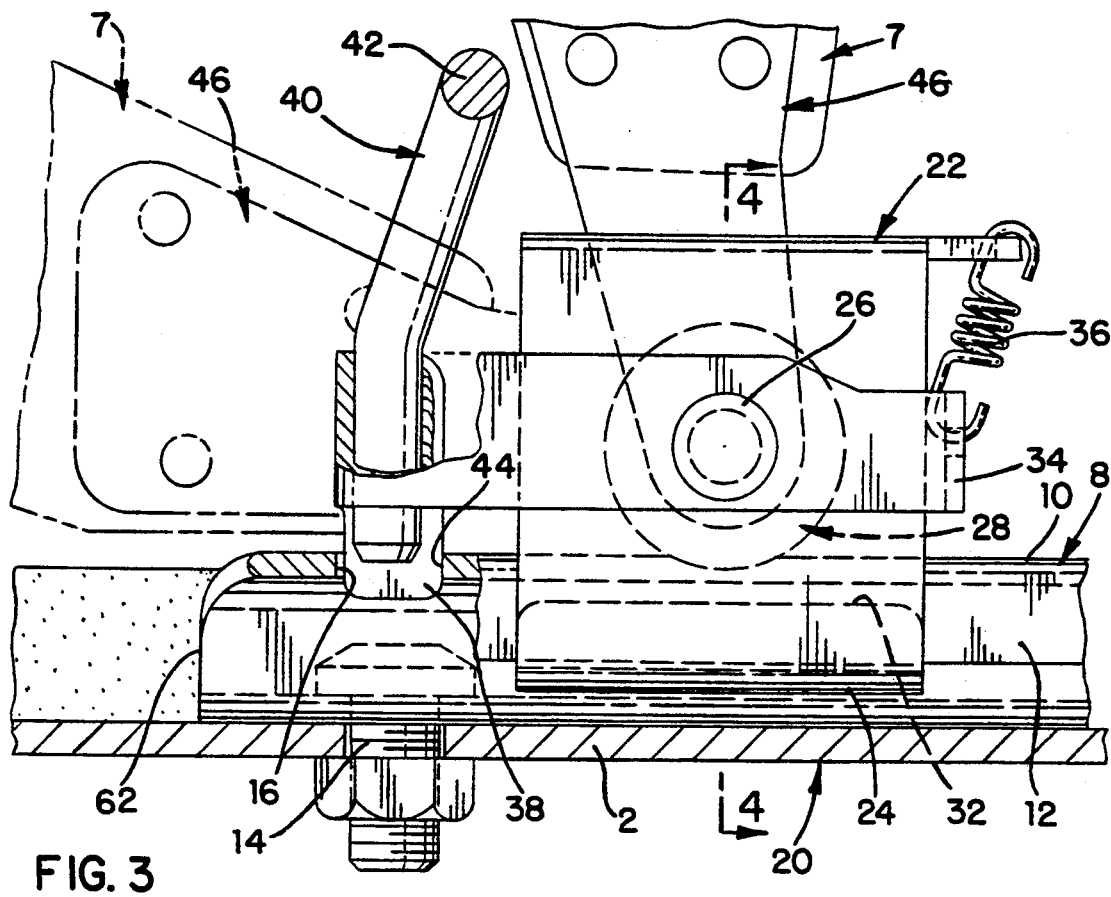
FIG. 3 is an enlarged view of a portion of the present invention illustrated in FIG. 2.
Figure 4:
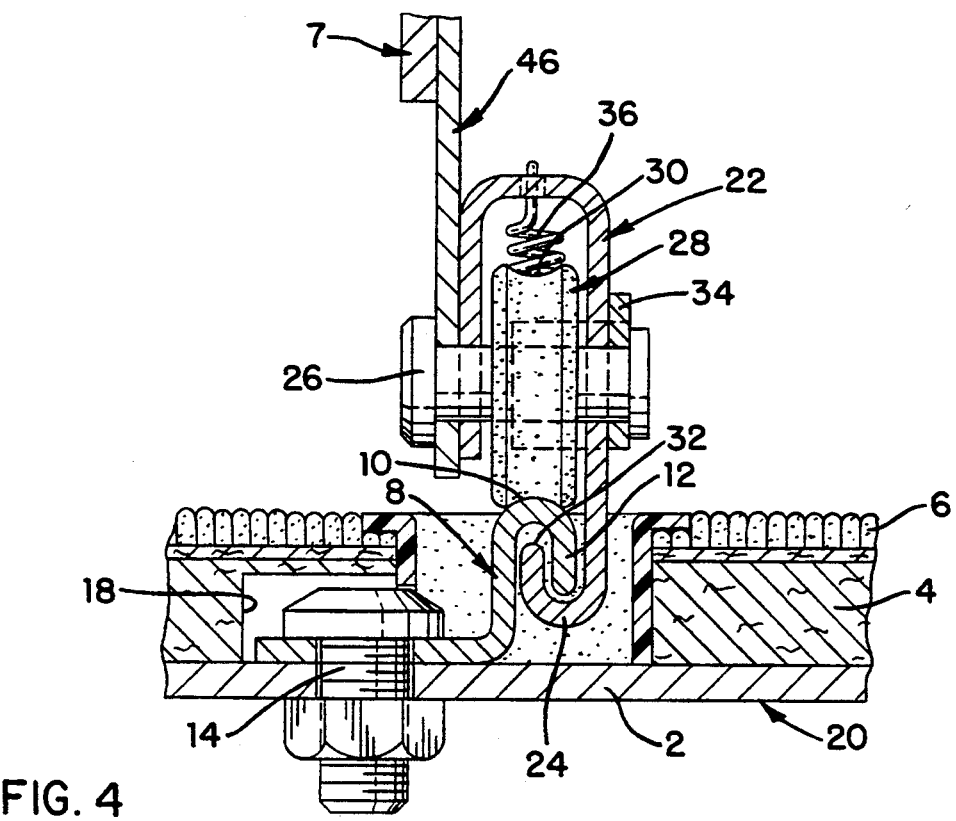
FIG. 4 is a view taken along line 4—4 of FIG. 3.

Referring to FIGS. 1 through 4, the inventive seat arrangement 7 of the present invention is shown in the environment of the interior of a minivan 20. The present invention has two generally parallel rails 8 which are connected to the metallic floor 2 of the minivan by a threaded fastener 14. If desired, the rails 8 may be connected by other suitable means such as welding. The rail 8 has a hooked section 12 having a crown 10 which slightly extends above the top level of the carpet 6. The rail 8 is preferably mainly submerged below the carpet 6 and is placed within a longitudinal slot 18 which has been gored out of the carpet backing 4. Although not required, the rail will typically have its hook 12 open on the outboard direction. Therefore, as shown in FIG. 4, the rail for the opposite side of the seat would be opened to the left rather than to the right as for the rail 8 shown in FIG. 4. The rail 8 also has at least two longitudinally spaced notches 16 allowing the crown 10 of the rail to provide a locking aperture whose function will be later described.

Located generally on top of each rail 8 is a slider 22 having a hook 24 for interconnection with the hook 12 of the rail. The slider 22 also has rotatably mounted thereto, by a pin 26, a roller 28. The roller 28 has a generally concave surface 30 and is typically fabricated from a polymeric, or rubberized material. To minimize noise and vibration, the concave surface 30 also provides lateral stability and alignment for the riser with respect to the rail 8. Although not shown, a fluorinated ethylene propylene resin cap may be placed between a tip 32 of the sticky hook 24 and the hook 12 of the rail to lower friction and/or to load the roller 28 so that the roller 28 is in a slight tension to aid in reducing chucking (vibration of the seat experienced upon loading or adjustment) of the vehicle seat 7.

Pivotally mounted via the pin 26 along the same pivotal axis of the roller 28 is a locking pin bar 34. The forward end of the locking pin bar 34 is spring biased upward or in a counterclockwise rotation as shown in FIG. 3 by a spring 36. At the opposite side of the locking pin bar is a plate member 38 which is sized for insertion within one of the notches 16. The plate 38 is also connected with a handle 40 having a crossbar section 42 which in like manner is attached to a locking plate 38 for the other respective rail. Although not shown in FIG. 3, if desirable, the plate 38 may have a slight taper enabling it to hook into a forward end 44 of the notch 16.

Figure 1:
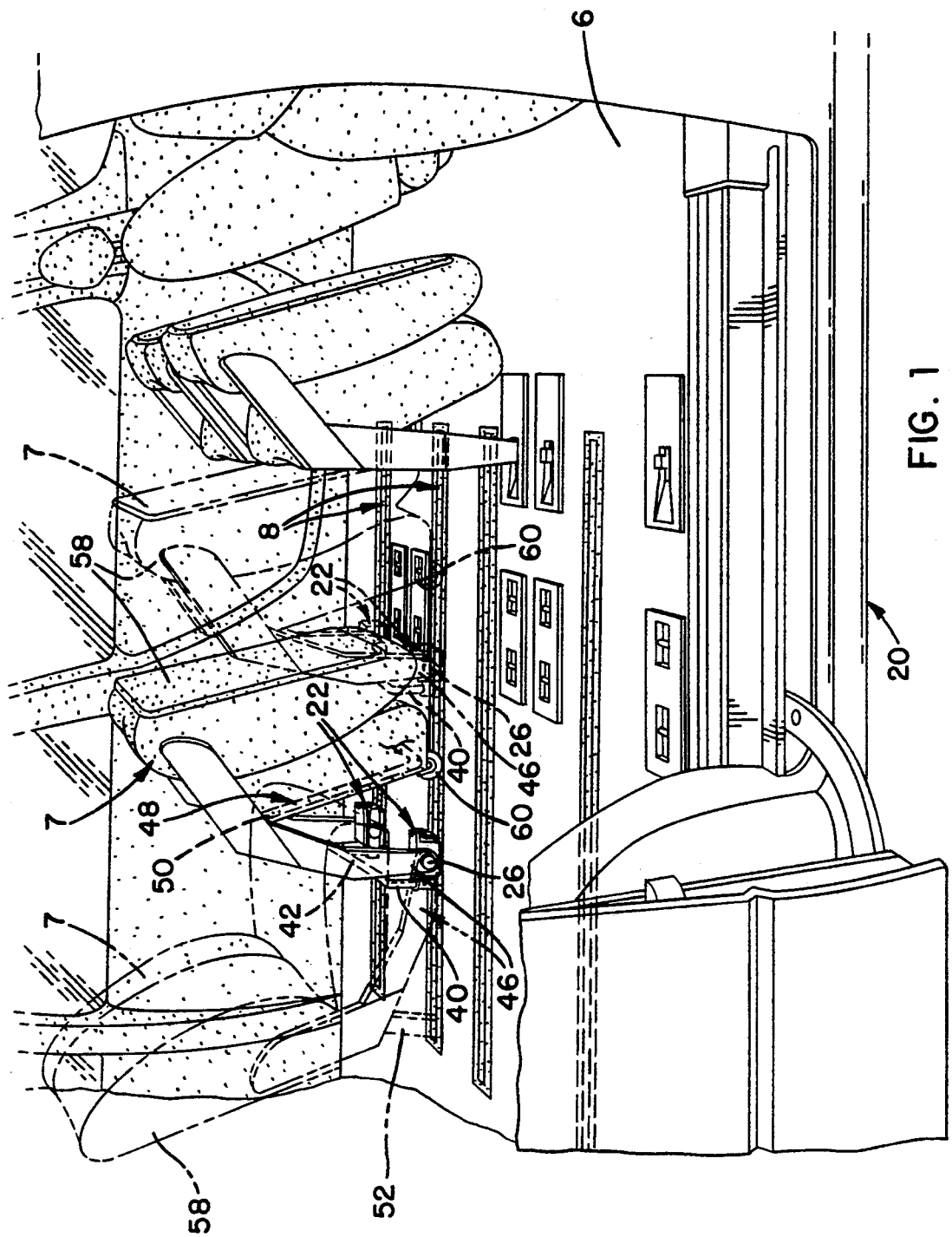
FIG. 1 is a perspective view of a preferred embodiment of the present invention in the environment of a minivan-type vehicle.
Figure 2:
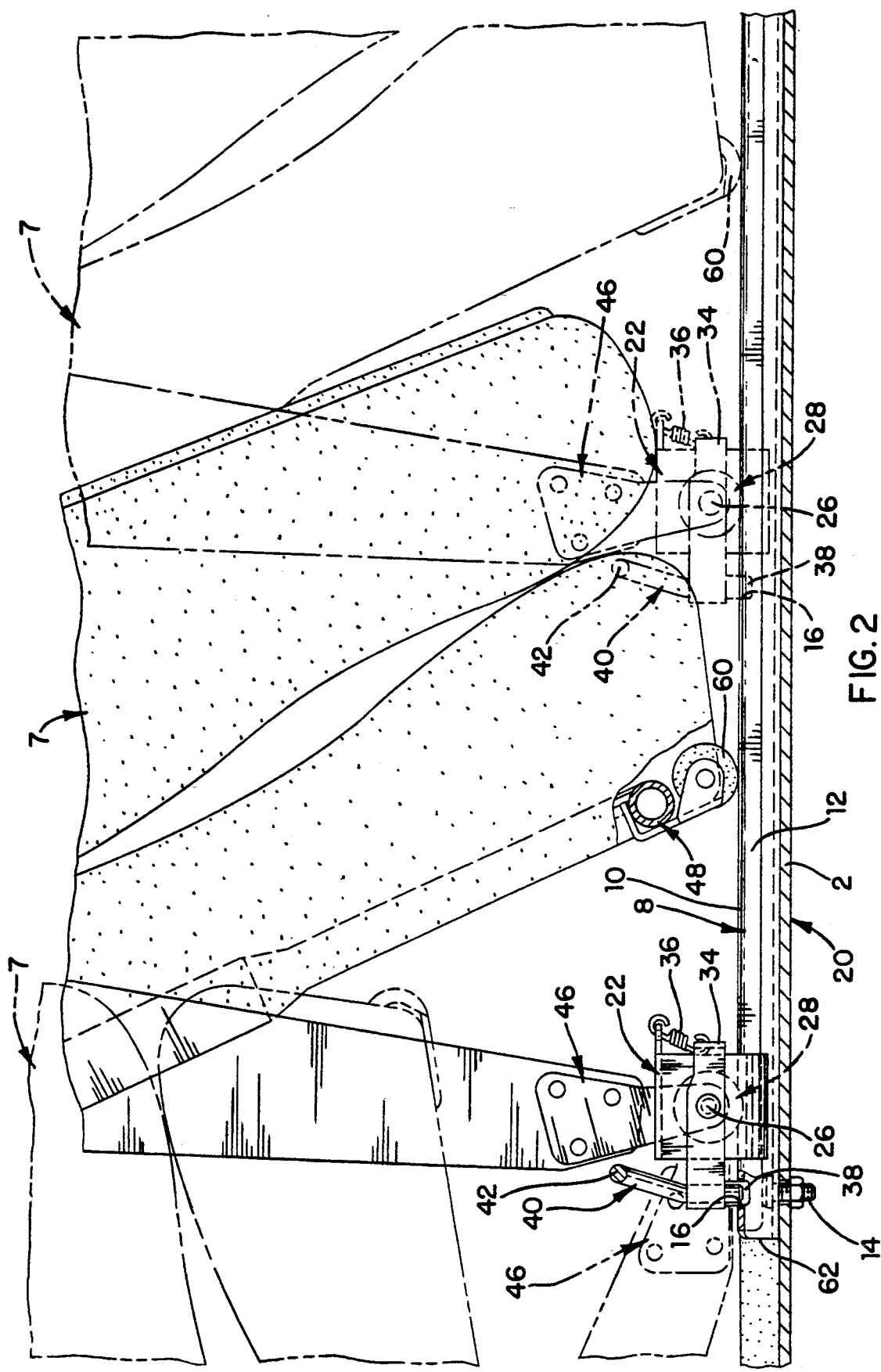
FIG. 2 is a side elevational view illustrating the various storage positions of a seat arrangement according to that shown in FIG. 1.

Also pivotally mounted via the pin 26 is a forward riser 46 of the seat 7. The forward riser 46 extends upwardly and rearwardly from the slider 22 to connect with a frame 48 of the seat bun or cushion adjacent its rearward end 50 (FIG. 1). In a seated position, the seat bun frame 48 extends forwardly from the forward riser 46. The seat bun frame is also connected, either directly or via a linkage, to a rear riser 52 which has a conventional clamping means not part of this invention which clamps with a locking fixture located in the floor 2 of the vehicle when the seat 7 is in an upright position.

To allow the seat 7 to assume its storage position, the rear riser 52 must be released from the floor by a mechanism which is not shown. A release lever (not shown) is pulled to allow a seatback 58, which is pivotally connected with the bun frame 48, to be folded forwardly. Thereupon, the front riser can be pivoted forwardly to bring the seat 7 to a generally upright storage position.

The seat frame 48 has at its forward end a contact surface provided by a roller 60 which is generally identical or similarly shaped to the roller 28 and having a similar concave surface 30 providing lateral stability.

One of the foremost advantages of the present invention is that it allows the rear or third row seating of the minivan to have two storage positions, one which is closely adjacent a rear door opening of the vehicle (not shown) and one which is closer to the second row seating of the vehicle. To get the seat 7 to move to its more forward storage position, the driver of the vehicle will simply pull up on the lever 42, allowing the plate 38 to be removed from the most rearward notch 16. Thereupon, the plate 38 will ride upon the crown 10 of the rail 8 until it comes to the next notch 16 where it will automatically pop back into position, due to the spring biasing, into a more forward storage position. Therefore, the driver of the vehicle can move the seat 7 forwardly while at the same time not requiring the seat 7 to be removed from the rails 8. Due to the interlocking of the slider 22 with the floor rail 8, seat belt restraints may be attached directly to the seat and do not have to be attached or anchored to the vehicle side walls or floor.

Removal of the seat 7 from the vehicle is quite easily accomplished by simply pulling up on the lever 42 and bringing the entire slider hook 24 past an extreme rearward end 62 of the rail to the left as shown in FIG. 3).

An added feature that can optionally be added in that linkage arrangement (not shown) prevents a seatback 58 from being extended back into its upright position until the rear riser 52 and the locking plate 38 are both in engaged positions.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of a vehicle seat for placement on a vehicle floor having a seat in a storage position comprising:
    an elongated rail means connected to the vehicle floor, the rail means having a first hook means and a locking aperture means;
    a slider means having a second hook means interlocked with the first hook means;
    locking pin means for selective engagement with the locking aperture means, the locking pin means being connected with the slider means to selectively set the position of the slider means with respect to the rail means;
    a riser pivotally connected with the slider means; and
    a seat bun or cushion connected with the riser, the seat bun assuming a storage position by forward pivotal movement of the riser.

2. An arrangement of a vehicle seat as described in claim 1 wherein the seat bun forward end has a contact surface for engagement with the floor in a storage position.

3. A seat arrangement as described in claim 2 wherein the seat bun forward end contact surface engages with the floor via the rail means.

4. A seat arrangement as described in claim 3 wherein a roller provides the seat bun forward end contact surface.

5. A seat arrangement as described in claim 4 wherein the seat bun forward end contact surface roller is curvilinear to provide lateral stabilization in cooperation with the rail means.

6. A seat arrangement as described in claim 1 wherein the slider has a roller.

7. A seat arrangement as described in claim 1 wherein the rail means has a plurality of locking aperture means to allow at least two positions of storage of the vehicle seat.

8. A seat arrangement as described in claim 1 wherein the locking aperture means is provided by notches in the rail means.

9. A seat arrangement as described in claim 1 wherein the rail has at least one end which allows disengagement of the seat by movement of the slider means past an extreme position with respect to the rail means.

10. An arrangement of a vehicle seat located on the floor of a vehicle having a seating position and a plurality of storage positions inside the vehicle, the arrangement comprising:
    two generally parallel elongated rails connected with the vehicle floor, the vehicle rails each having a first hook and having at least two notches locationally separate from one another in the rails;
    a slider associated with each rail, the slider having a hook interconnected with the hook of each respective rail, the slider having rotatively connected thereto a roller allowing the slider to move on top of the rail;
    a locking pin biased for engagement with one of the notches in the rail to selectively set the position of the slider with respect to the rail;
    a riser pivotally connected with each slider extending generally rearwardly; and
    a seat bun frame connected with the riser, the seat bun frame having at a forward end a roller and the seat bun frame assuming a storage position in contact with the rail by pivotal forward movement of the riser.

* * * * *